(12) United States Patent
Salter et al.

(10) Patent No.: US 10,166,913 B2
(45) Date of Patent: Jan. 1, 2019

(54) SIDE MARKER ILLUMINATION

(71) Applicant: Ford Global Technologies, LLC, Dearborn, MI (US)

(72) Inventors: Stuart C. Salter, White Lake, MI (US); Paul Kenneth Dellock, Northville, MI (US); Cornel Lewis Gardner, Romulus, MI (US); Keith Hoelscher, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/459,768

(22) Filed: Mar. 15, 2017

(65) Prior Publication Data

US 2018/0264999 A1    Sep. 20, 2018

(51) Int. Cl.
| | |
|---|---|
| *B60Q 1/24* | (2006.01) |
| *B60Q 1/26* | (2006.01) |
| *B60Q 1/32* | (2006.01) |
| *B60Q 3/68* | (2017.01) |
| *B60Q 3/74* | (2017.01) |
| *B60Q 3/78* | (2017.01) |
| *B60R 1/06* | (2006.01) |
| *B60R 1/12* | (2006.01) |
| *B60Q 3/217* | (2017.01) |
| *B60Q 3/233* | (2017.01) |

(52) U.S. Cl.
CPC .............. *B60Q 3/217* (2017.02); *B60Q 1/24* (2013.01); *B60Q 1/2665* (2013.01); *B60Q 1/323* (2013.01); *B60Q 3/233* (2017.02); *B60Q 3/68* (2017.02); *B60Q 3/745* (2017.02); *B60Q 3/78* (2017.02); *B60R 1/06* (2013.01); *B60R 1/1207* (2013.01); *B60Q 2400/40* (2013.01)

(58) Field of Classification Search
CPC .......... B60Q 3/745; B60Q 3/00; B60Q 3/217; B60Q 3/20; B60Q 3/233; B60Q 3/242; B60Q 3/258; B60Q 3/267; B60Q 3/51; B60Q 3/78
See application file for complete search history.

(56) References Cited

U.S. PATENT DOCUMENTS

| | | | |
|---|---|---|---|
| 2,486,859 | A | 11/1949 | Meijer et al. |
| 5,053,930 | A | 10/1991 | Benavides |
| 5,434,013 | A | 7/1995 | Fernandez |
| 5,709,453 | A | 1/1998 | Krent et al. |
| 5,839,718 | A | 11/1998 | Hase et al. |
| 6,031,511 | A | 2/2000 | DeLuca et al. |
| 6,117,362 | A | 9/2000 | Yen et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Alexander K Garlen
*Assistant Examiner* — Colin J Cattanach
(74) *Attorney, Agent, or Firm* — Jason Rogers; Price Heneveld LLP

(57) ABSTRACT

A vehicle includes a side mirror positioned on an A-pillar. A light assembly is coupled with a bottom surface of the side mirror. The light assembly is configured to illuminate a plurality of photoluminescent structures located within an interior and on an exterior of the vehicle when the vehicle is in a door off configuration.

20 Claims, 5 Drawing Sheets

(56) References Cited

U.S. PATENT DOCUMENTS

| | | |
|---|---|---|
| 6,294,990 B1 | 9/2001 | Knoll et al. |
| 6,419,854 B1 | 7/2002 | Yocom et al. |
| 6,494,490 B1 | 12/2002 | Trantoul |
| 6,536,928 B1 | 3/2003 | Hein et al. |
| 6,577,073 B2 | 6/2003 | Shimizu et al. |
| 6,616,312 B2 | 9/2003 | Carter |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,304,255 B1 | 12/2007 | Pratt |
| 7,347,576 B2 | 3/2008 | Wang et al. |
| 7,427,150 B2 | 9/2008 | Carter et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,220,866 B1 | 7/2012 | Hart et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,491,170 B2 * | 7/2013 | Rodriguez Barros ......... B60R 1/1207 362/494 |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 * | 4/2014 | Cowan ................... G09F 21/04 40/543 |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,452,709 B2 | 9/2016 | Aburto Crespo |
| 9,568,659 B2 | 2/2017 | Verger et al. |
| 9,616,812 B2 | 4/2017 | Sawayanagi |
| 2001/0000443 A1 * | 4/2001 | Galicia ................... B60R 1/007 359/871 |
| 2002/0159741 A1 | 10/2002 | Graves et al. |
| 2002/0163792 A1 | 11/2002 | Formoso |
| 2002/0176245 A1 * | 11/2002 | Fuwausa ................ B60K 35/00 362/84 |
| 2003/0095415 A1 * | 5/2003 | Carter ................... B60Q 1/323 362/488 |
| 2003/0167668 A1 | 9/2003 | Kuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0180728 A1 * | 7/2011 | Sawayanagi ............ B60Q 3/68 250/461.1 |
| 2011/0265360 A1 | 11/2011 | Podd et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0198515 A1 | 7/2014 | Tulio et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0138791 A1 * | 5/2015 | Salter .................... B60Q 3/54 362/510 |
| 2015/0138813 A1 * | 5/2015 | Salter .................... B60Q 3/252 362/510 |
| 2015/0138816 A1 * | 5/2015 | Salter .................... G02B 27/01 362/510 |

(56) References Cited

U.S. PATENT DOCUMENTS

| | | | |
|---|---|---|---|
| 2015/0175057 A1* | 6/2015 | Salter | F21S 43/13 |
| | | | 362/510 |
| 2015/0197186 A1* | 7/2015 | Salter | B60Q 3/68 |
| | | | 362/510 |
| 2015/0267881 A1 | 9/2015 | Salter et al. | |
| 2015/0307033 A1 | 10/2015 | Preisler et al. | |
| 2015/0329041 A1* | 11/2015 | Salter | B60R 22/12 |
| | | | 362/510 |
| 2016/0016506 A1 | 1/2016 | Collins et al. | |
| 2016/0102819 A1 | 4/2016 | Misawa et al. | |
| 2016/0131327 A1 | 5/2016 | Moon et al. | |
| 2016/0236613 A1 | 8/2016 | Trier | |
| 2016/0240794 A1 | 8/2016 | Yamada et al. | |
| 2017/0158125 A1 | 6/2017 | Schuett et al. | |
| 2017/0210282 A1* | 7/2017 | Rodriguez Barros | B60Q 1/323 |
| 2017/0253179 A1 | 9/2017 | Kumada | |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| DE | 102015113654 A1 | 3/2016 |
| DE | 102016103372 A1 | 9/2016 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

SIDE MARKER ILLUMINATION

FIELD OF THE INVENTION

The present disclosure generally relates to vehicle side markers, and more particularly, to illuminated side markers.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present disclosure, a vehicle includes a side mirror positioned on an A-pillar. A light assembly is coupled with a bottom surface of the side mirror. The light assembly is configured to illuminate a plurality of photoluminescent structures located within an interior and on an exterior of the vehicle when the vehicle is in a doors off configuration.

According to another aspect of the present disclosure, a vehicle includes a side mirror positioned on an A-pillar. A light assembly is coupled to the side mirror. An interior side marker is positioned on a seat assembly. An exterior side marker is positioned on an external surface of a door. The light assembly is configured to illuminate the interior and exterior side markers.

According to yet another aspect of the present disclosure, a vehicle includes a side mirror positioned on an A-pillar. A light assembly is coupled to the side mirror. A door is positioned proximate the side mirror operable between closed and open positions. The light assembly is configured to illuminate photoluminescent structures positioned on a seat assembly and an inner surface of the door.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Figure 1A:
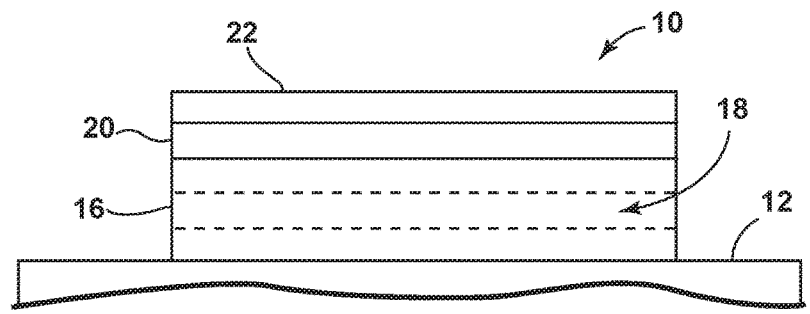
FIG. 1A is a side view of a photoluminescent structure rendered as a coating for use in an assembly according to one embodiment.
Figure 1B:
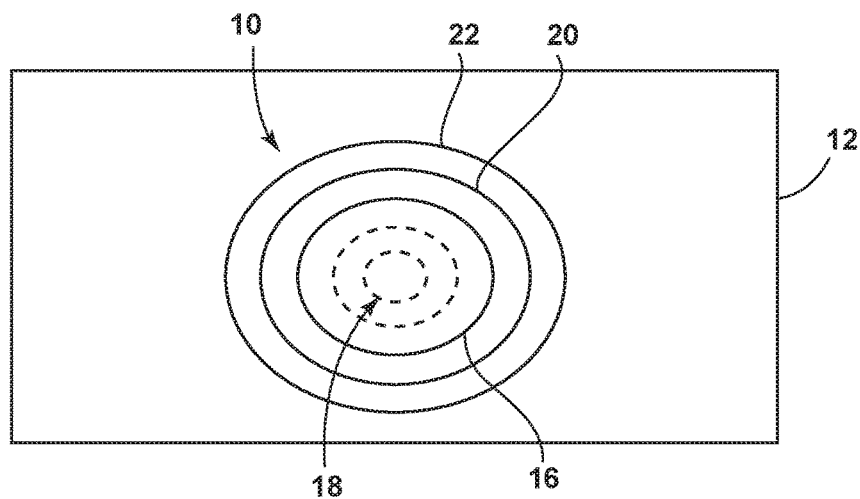
FIG. 1B is a top view of a photoluminescent structure rendered as a discrete particle according to one embodiment.
Figure 1C:
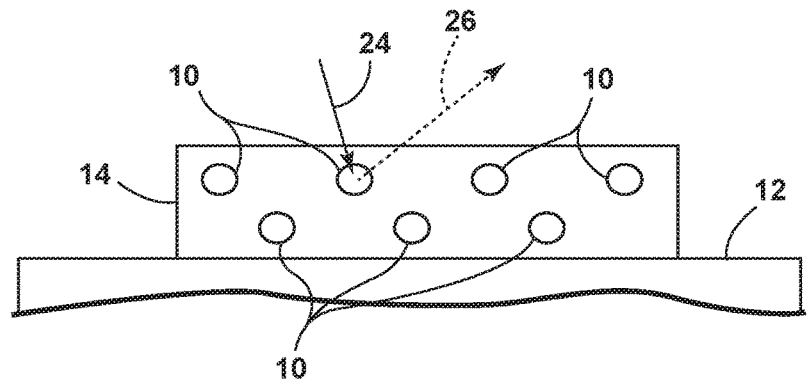
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle-related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26, that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by the sun, ambient sources and/or a light source is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some examples, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principle driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 $mcd/m^2$. A visibility of 0.32 $mcd/m^2$ is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source and/or ambient sources. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Agrawal et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m$^2$ after a period of 10 minutes. Additionally, the long persistence photoluminescent material 18 may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources that emits the excitation light 24, including, but not limited to, natural light sources (e.g., the sun) and/or any artificial light source. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m$^2$, or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue-emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long persistence phosphor, such as Performance Indicator PI-BG20, and 12.5 parts of a dye solution containing 0.1% Lumogen Yellow F083 in dioxoane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Referring now to FIGS. 2-5, a vehicle 40, is depicted including a side mirror 44 positioned on an A-pillar 48. A light assembly 52 is coupled with the side mirror 44. The light assembly 52 is configured to illuminate a plurality of photoluminescent structures 10 located within an interior 40A and on an exterior 40B of the vehicle 40 when the vehicle 40 is in a doors off configuration. The vehicle 40 may further include an interior side marker 56 positioned on a seat assembly 60. An exterior side marker 64 may be positioned on an exterior surface 68A of a door 68. The light assembly 52 may be configured to illuminate the interior and exterior side markers 56, 64.

Figure 2:
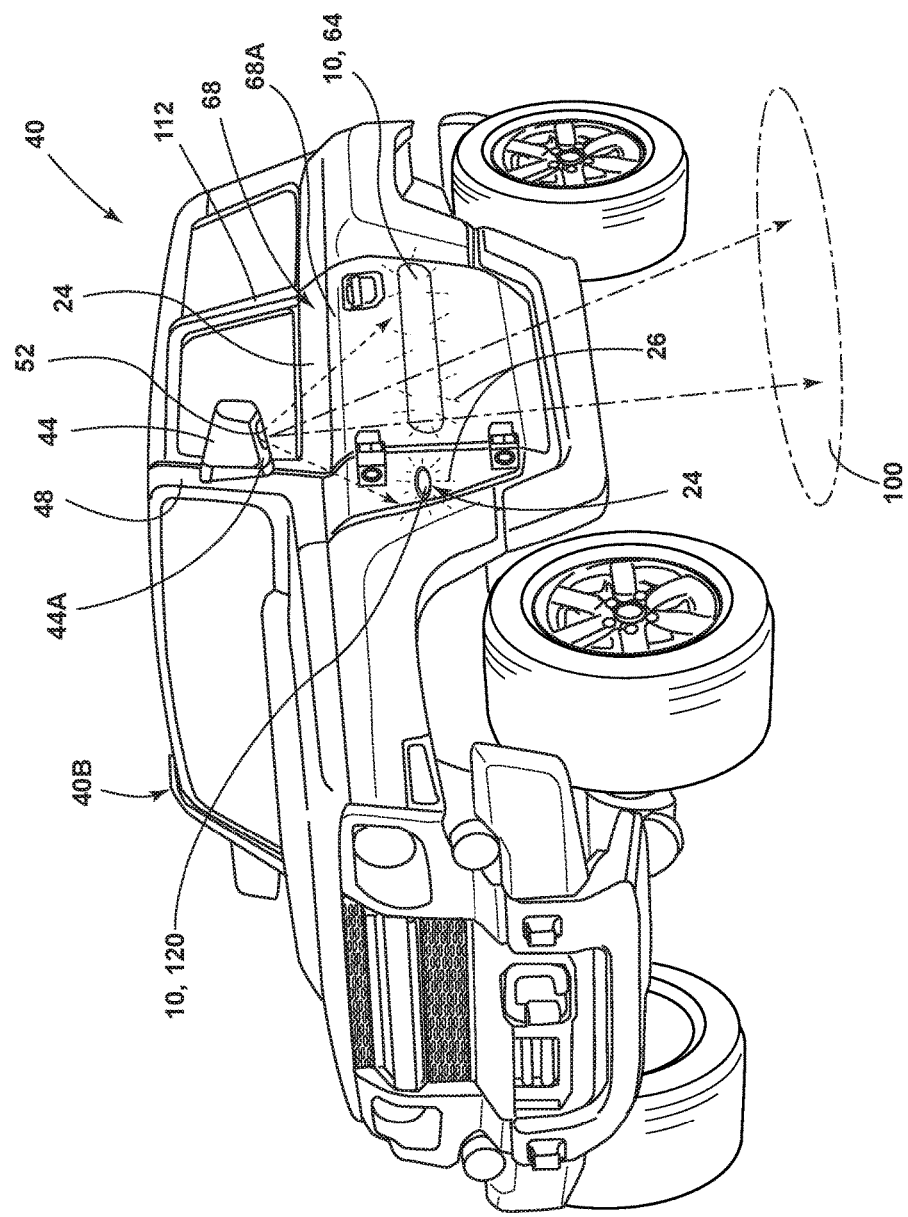
FIG. 2 is a front perspective view of a vehicle in a "doors on" configuration, according to at least one example.
Figure 3:
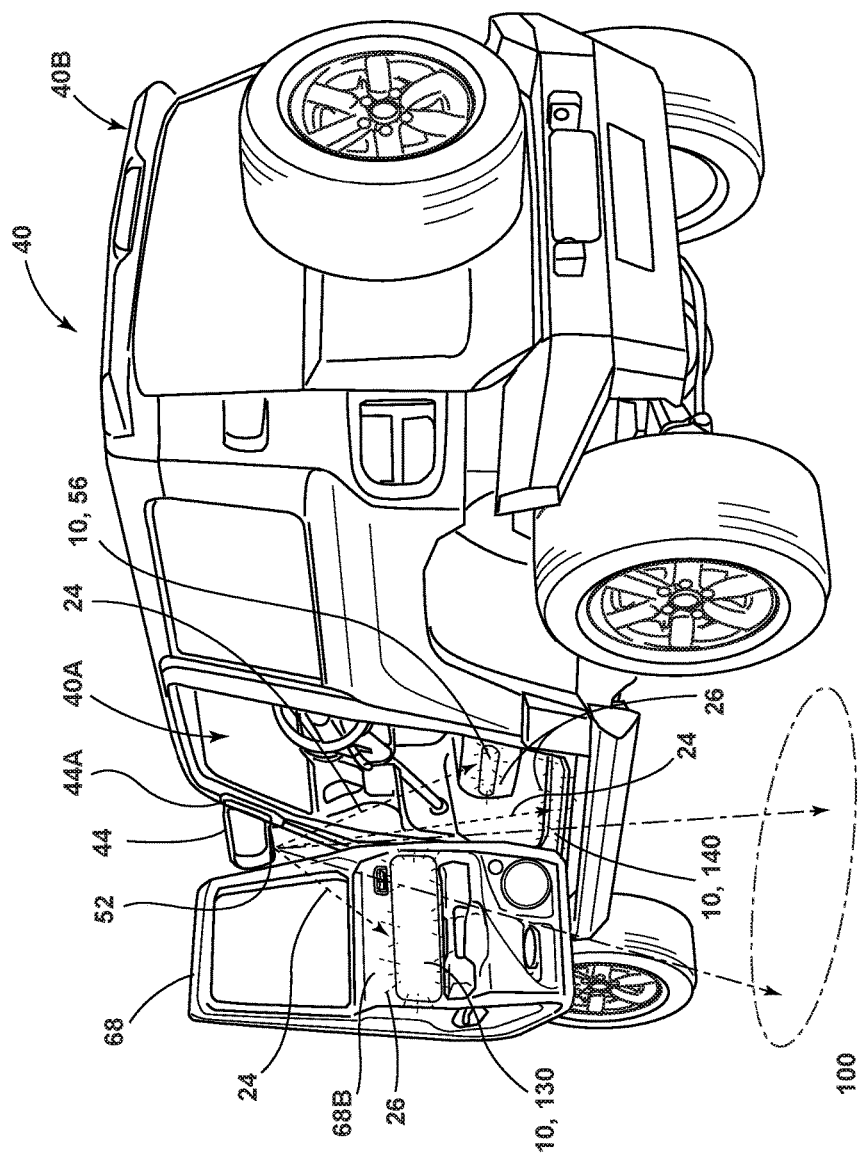
FIG. 3 is a rear perspective view of a vehicle, according to at least one example.
Figure 4:
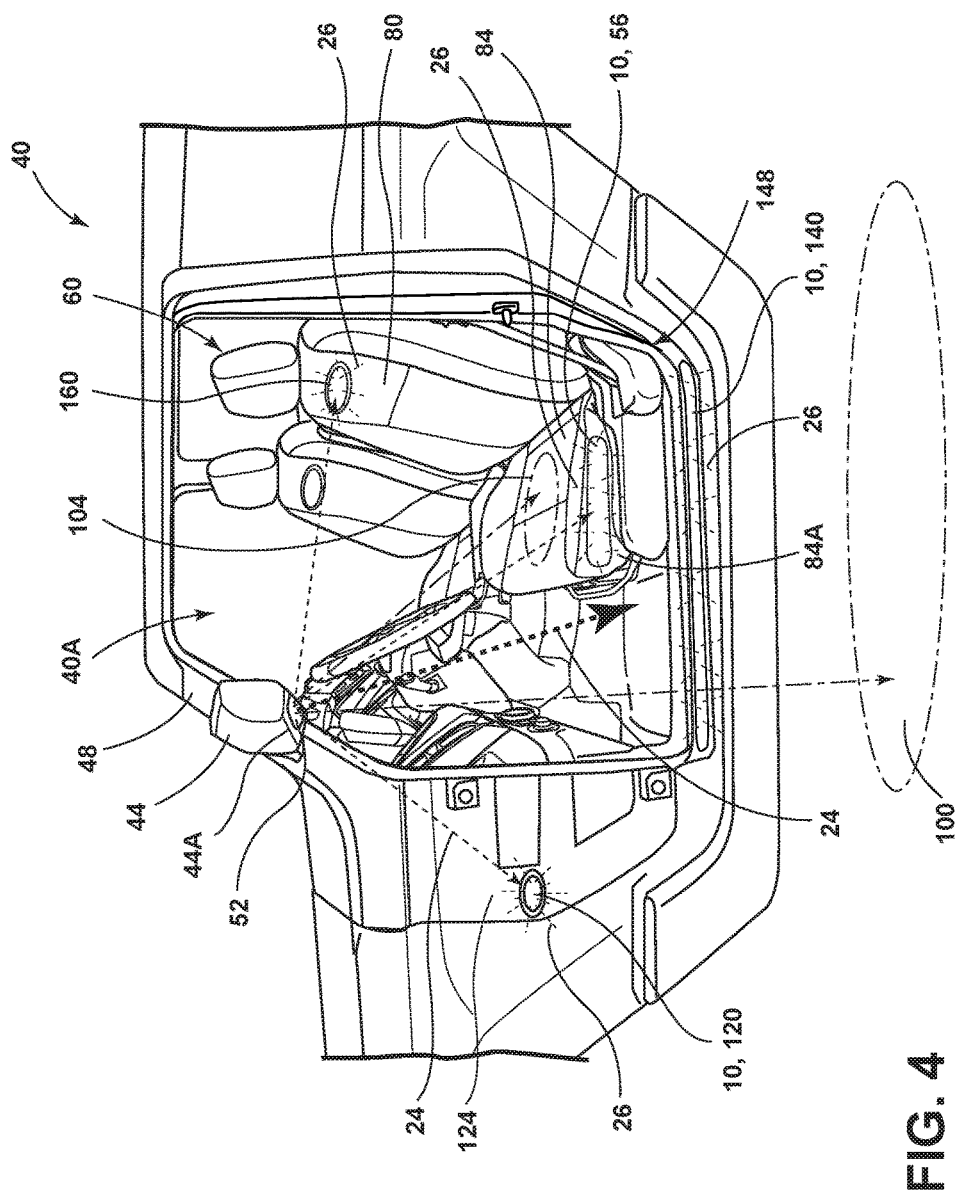
FIG. 4 is a side perspective view of a vehicle in a "doors off" configuration, according to at least one example.

Referring now to FIGS. 2-4, the vehicle 40 is depicted in a "doors on" configuration. The vehicle 40 is capable of operation in the doors on configuration (FIGS. 2 and 3) and a "doors off" configuration (FIG. 4). In the doors on configuration, the vehicle 40 includes a plurality of doors 68 (e.g., driver and passenger doors) positioned around the vehicle 40 enclosing an interior 40A, or passenger cabin, of the vehicle 40. The doors 68 are operable between a closed position (FIG. 2) and an open position (FIG. 4). In essence, the vehicle 40 may be operated in a doors on configuration with the doors 68 attached to a frame of the vehicle 40. In the doors off configuration, one or more of the doors 68 may be removed prior to operation (e.g., driving) of the vehicle 40 such that increased ventilation and/or a desired aesthetic appeal of the vehicle 40 is achieved. It will be understood that although shown in relation to a front passenger portion of the vehicle 40, the disclosure provided below may equally be applied to a rear passenger portions of the vehicle 40 as well as a passenger side of the vehicle 40.

The seat assembly 60 may be positioned within the interior 40A of the vehicle 40. The seat assembly 60 includes a seatback 80 and a seat base 84. According to various examples, the seatback 80 may be operably coupled with the seat base 84 and configured to pivot relative to the seat base 84. The seat assembly 60 may be a single, or bucket, seat or may be a multi-person, or bench, seat. In bench seat examples, the seat assembly 60 may include a plurality of seatbacks 80 and a single seat base 84. The seat base 84 may define an outboard surface 84A proximate the doors 68 of the vehicle 40. For purposes of this disclosure, the term outboard may mean outward, or away from a center of the vehicle 40 while the term inboard may mean toward, or proximate a center of the vehicle 40.

The side mirror 44 may be positioned on the "A" pillar 48 of the vehicle 40. In the depicted example, the side mirror 44 is coupled, or positioned, proximate a center of the A-pillar 48, but it will be understood that the side mirror 44 may be coupled toward a base or a top of the A pillar 48. According to various examples, the side mirror 44 may be pivotable (e.g., to adjust viewing and/or light emission patterns) relative to the A-pillar 48. In examples where the side mirror 44 is coupled to the A-pillar 48, the side mirror 44 may not be coupled to the door 68. As such, the side mirror 44 may not move when the door 68 is transitioned between the open and closed positions. Further, when the vehicle 40 is in the doors off configuration, the side mirror 44 remains coupled with the vehicle 40.

The light assembly 52 is coupled with the side mirror 44. As such, the light assembly 52 may remain operable, and coupled with the vehicle 40, in both the doors on and doors off configurations of the vehicle 40. In the depicted example, the light assembly 52 is coupled with a bottom surface 44A of the side mirror 44, but it will be understood that the light assembly 52 may be positioned on a top and/or sides (e.g., vehicle forward, inboard, outboard and/or vehicle rearward) of the side mirror 44 without departing from the teachings provided herein. The light assembly 52 may include a plurality of light sources. The light sources may be configured to emit visible (e.g., white and/or colored) light, as well as non-visible light (e.g., infrared, near-infrared, ultraviolet and/or the excitation light 24). The light sources may be light-emitting diodes, incandescent bulbs, electroluminescent devices and/or other types of devices capable of emitting electromagnetic radiation. The light assembly 52 may include a single light source or a plurality of light sources. For example, the light assembly 52 may include between 1 and about 10 light sources. In a specific example, the light assembly 52 may include 6 light sources. Each of the light sources may illuminate or excite a different region (e.g., photoluminescent structure 10, or area) of the vehicle 40. As such, each of the light sources may be configured to emit a different color or wavelength band of light based on the location it illuminates. The light sources of the light assembly 52 may emit light into the interior 40A of the vehicle 40 as well as onto an exterior 40B of the vehicle 40. As will be explained in greater detail below, the light assembly 52 may provide a plurality of illuminations to both the interior and exterior 40A, 40B of the vehicle 40. For example, the light assembly 52 may illuminate the plurality of photoluminescent structures 10 positioned within the interior and exterior 40A, 40B of the vehicle 40. For purposes of this disclosure, to illuminate may mean to provide the excitation light 24, visible and/or non-visible light to a region or area of the vehicle 40. In visible light illumination examples, the light assembly 52 may emit a puddle lamp 100 on a ground beneath the vehicle 40 and/or may emit a map lamp 104 on the seat assembly 60 within the interior 40A of the vehicle 40. The map lamp 104 may be shown on to the seat base 84 such that the map lamp 104 is proximate or below a belt line of an occupant of the seat assembly 60. It will be understood that the puddle lamp 100 and map lamp 104 may be emitted regardless of whether the door 68 is in the open or closed position or the vehicle 40 is in the doors on or doors off configuration.

Referring now to FIG. 2, the exterior side marker 64 is positioned on an exterior surface 68A of the door 68. In the depicted example, the exterior side marker 64 is shown as extending across the exterior surface 68A of the door 68, but it will be understood that the exterior side marker 64 may extend across only a portion of the exterior surface 68A. The exterior side marker 64 may be positioned at a bottom, middle or top of the door 68 or any location therebetween. It will be understood that the exterior side marker 64 may extend onto a B-pillar 112 and/or onto other doors 68 without departing from the teachings provided herein. The exterior side marker 64 is depicted as a single, unitary, structure, but it will be understood that the marker 64 may be composed of a plurality of smaller markers, each of the same, or varying, size. Further, the vehicle 40 and/or door 68 may include a plurality of exterior side markers 64. According to at least one example, the exterior side marker 64 may be painted onto the exterior surface 68A of the door 68. According yet other examples, the exterior side marker 64 may be part of a sticker which is adhered to the exterior surface 68A of the door 68.

According to various examples, the exterior side marker 64 may include the photoluminescent structure 10. As such, illumination of the exterior side marker 64 by the light assembly 52 may excite the marker 64 into emitting visible light (e.g., the converted light 26). The illumination by the light assembly 52 may further function to charge (e.g., in persistent phosphor examples) the exterior side marker 64 such that the marker 64 emits light over a sustained period of time without constant and/or continual illumination by the light assembly 52. It will be understood that the exterior side marker 64 may further be charged, or caused to emit light, from ambient lighting (e.g., the sun, moon, street lamps, etc.) and/or illumination (e.g., head lights) from other vehicles. Further, the exterior side marker 64 may be charged while door 68 is in either the open or closed positions and even while the door 68 is removed from the vehicle 40. The exterior side marker 64 may include one or a plurality of reflective elements which may reflect visible and/or nonvisible light which may be advantageous in increasing the visibility of the vehicle 40.

The exterior side marker 64 is configured to emit light outwardly and away from the vehicle 40. The light emitted from the exterior side marker 64 may be a variety of colors based on the charging or excitation light 24 received from the light assembly 52. For example, the exterior side marker 64 may be configured to glow, or emit, amber colored light while the vehicle 40 is in motion (e.g., driving). In another example, the exterior side marker 64 may be configured to emit white or colored light while the vehicle 40 is not in motion (e.g., parked). Further, the light emitted from the exterior side marker 64 may take a variety of other colors which may provide an aesthetically pleasing appearance to the vehicle 40 (e.g., based on predefined user preferences or color schemes of the vehicle 40).

Use of the exterior side marker 64 may be advantageous in increasing a visibility of the vehicle 40 under low lighting conditions. For example, illumination of the exterior side marker 64 may not only cause the marker 64 to immediately emit light, but may also charge the marker 64 to sustain a predefined, or desired, luminance for an extended period of time. Further, incorporation of one or more reflective elements into the exterior side marker 64 may provide a passive illumination which may increase the visibility of the vehicle 40.

A badge 120 is positioned on a front quarter panel 124 of the vehicle 40. It will be understood that the vehicle 40 may include one or a plurality of badges 120. Further, the badge 120 may additionally be positioned on the door 68 of the vehicle 40. The badge 120 may be an indicium configured to convey information on lookers of the vehicle 40 relating to the make, model, styling or trim package of the vehicle 40. Additionally or alternatively, the badge 120 may simply be a decorative or aesthetic styling.

According to various examples, the badge 120 may include the photoluminescent structure 10. As such, illumination of the badge 120 by the light assembly 52 may excite the badge 120 into emitting visible light. The illumination of the badge 120 by the light assembly 52 may further function to charge (e.g., in persistent phosphor examples) the badge 120 such that the badge 120 emits light over a sustained period of time without constant and/or continual illumination by the light assembly 52. It will be understood that the badge 120 may further be charged, or caused to emit light, from ambient lighting (e.g., the sun, moon, street lamps, etc.) and/or illumination (e.g., head lights) from other vehicles. Further, the badge 120 may be charged while door 68 is in either the open or closed positions and even while the door 68 is removed from the vehicle 40.

The badge 120 is configured to emit light outwardly and away from the vehicle 40. The light emitted from the badge 120 may be a variety of colors based on the charging or excitation light 24 received from the light assembly 52. For example, exterior side marker 64 may be configured to glow, or emit, white or colored light which may provide an aesthetically pleasing appearance to the vehicle 40 (e.g., based on predefined user preferences or color schemes of the vehicle 40).

Referring now to FIG. 3, a door open indicator 130 is positioned on an interior surface 68B of the door 68. In the depicted example, the door open indicator 130 is shown as extending across the interior surface 68B of the door 68, but it will be understood that the door open indicator 130 may extend across only a portion of the interior surface 68B. The door open indicator 130 may be positioned at a bottom, middle or top of the door 68 or any location therebetween. It will be understood that the door open indicator 130 may be positioned on other doors 68 without departing from the teachings provided herein. The door open indicator 130 is depicted as a single, unitary, structure, but it will be understood that the door open indicator 130 may be composed of a plurality of smaller markers, each of the same, or varying, size. According to at least one example, the door open indicator 130 may be painted onto the interior surface 68B of the door 68. According to yet other examples, the door open indicator 130 may be part of a sticker which is adhered to the interior surface 68B of the door 68.

According to various examples, the door open indicator 130 may include the photoluminescent structure 10. As such, illumination of the door open indicator 130 by the light assembly 52 may excite the indicator 130 into emitting visible light. The illumination by the light assembly 52 may further function to charge (e.g., in persistent phosphor examples) the door open indicator 130 such that the indicator 130 emits light over a sustained period of time without constant and/or continual illumination by the light assembly 52. It will be understood that the door open indicator 130 may further be charged, or caused to emit light, from ambient lighting (e.g., the sun, moon, street lamps, etc.) and/or illumination (e.g., head lights) from other vehicles. The door open indicator 130 may be charged by the light assembly 52 while door 68 is in the open position and/or even while the door 68 is removed from the vehicle 40. The door open indicator 130 may include one or a plurality of reflective elements which may reflect visible and/or nonvisible light which may increase visibility of the vehicle 40 while the door 68 is in the open position.

The door open indicator 130 is configured to emit light outwardly and rearwardly from the vehicle 40. The light emitted from the door open indicator 130 may be a variety of colors based on the charging or excitation light 24 received from the light assembly 52. For example, exterior side marker 64 may be configured to glow, or emit, red and/or white colored light. In another example, the door open indicator 130 may be configured to emit a colored light while the vehicle 40 is not in motion (e.g., parked). Further, the light emitted from the door open indicator 130 may take a variety of other colors which may provide an aesthetically pleasing appearance to the vehicle 40 (e.g., based on predefined user preferences or color schemes of the vehicle 40).

Use of the door open indicator 130 may be advantageous in increasing a visibility of the vehicle 40 under low lighting conditions. Further, the door open indicator 130 may provide a large and illuminated area allowing passing vehicles to quickly identify that the door 68 of the vehicle 40 is in the open position. For example, illumination of the door open indicator 130 may not only cause the indicator 130 to immediately emit light, but may also charge the indicator 130 to sustain a desired luminance for an extended period of time. Further, incorporation of one or more reflective elements into the door open indicator 130 may provide a passive illumination which may increase the visibility of the open door 68 of the vehicle 40.

Referring now to FIG. 4, the vehicle 40 is depicted in the doors off configuration. In such an example, the exterior side marker 64 (FIG. 2) may be removed from the vehicle 40 such that the interior side marker 56 and an auxiliary side marker 140 are desirable to increase the visibility of the vehicle 40.

The interior side marker 56 is positioned on the seat assembly 60. In the depicted example, the interior side marker 56 is positioned on the seat base 84, but it will be understood that the interior side marker 56 may additionally or alternatively be positioned on the seatback 88. The interior side marker 56 is positioned on the outboard surface 84A of the seat base 84. In the depicted example, the interior side marker 56 is shown as extending across the outboard surface 84A of the seat base 84, but it will be understood that the interior side marker 56 may extend across only a portion of the outboard surface 84A. The interior side marker 56 may be positioned at a bottom, middle or top of the seat base 84 or any location therebetween. It will be understood that multiple seat assemblies 60 within the vehicle 40 may include the interior side marker 56 without departing from the teachings provided herein. The interior side marker 56 is depicted as a single, unitary, structure, but it will be understood that the marker 56 may be composed of a plurality of smaller markers, each of the same, or varying, size. Further, the vehicle 40 and/or seat base 84 may include a plurality of interior side markers 56. According to at least one example, the interior side marker 56 may be painted onto, or incorporated into an upholstery of, the outboard surface 84A of the seat base 84. According to yet other examples, the interior side marker 56 may be part of a sticker which is adhered to the outboard surface 84A of the seat base 84.

According to various examples, the interior side marker 56 may include the photoluminescent structure 10. As such, illumination of the interior side marker 56 by the light assembly 52 may excite the marker 56 into emitting visible light. The illumination by the light assembly 52 may further function to charge (e.g., in persistent phosphor examples) the interior side marker 56 such that the marker 56 emits light over a sustained period of time without constant and/or continual illumination by the light assembly 52. It will be understood that the interior side marker 56 may further be charged, or caused to emit light, from ambient lighting (e.g., the sun, moon, street lamps, etc.) and/or illumination (e.g., head lights) from other vehicles. Further, the interior side marker 56 may be charged while the door 68 is in either the open or closed positions and even while the door 68 is removed from the vehicle 40. The interior side marker 56 may include one or a plurality of reflective elements which may reflect visible and/or nonvisible light which may increase visibility of the vehicle 40.

The interior side marker 56 is configured to emit light outwardly and away from the vehicle 40. The light emitted from the interior side marker 56 may be a variety of colors based on the charging or excitation light 24 received from the light assembly 52. For example, the interior side marker 56 may be configured to glow, or emit, amber colored light while the vehicle 40 is in motion (e.g., driving). In another example, the interior side marker 56 may be configured to emit white or colored light while the vehicle 40 is not in motion (e.g., parked). Further, the light emitted from the interior side marker 56 may take a variety of other colors which may provide an aesthetically pleasing appearance to the vehicle 40 (e.g., based on predefined user preferences or color schemes of the vehicle 40).

Use of the interior side marker 56 may be advantageous in increasing a visibility of the vehicle 40 while the vehicle 40 is in the door off configuration. For example, with the doors 68 removed from the vehicle 40, the interior side marker 56 is visible to other vehicles and designates a side of the vehicle 40. Further, the interior side marker 56 may be visible while the door 68 is in the open position. Illumination of the interior side marker 56 may not only cause the marker 56 to immediately emit light, but may also charge the marker 56 to sustain a desired luminance for an extended period of time. Further, incorporation of one or more reflective elements into the interior side marker 56 may provide a passive illumination which may increase the visibility of the vehicle 40. Even further, the interior side marker 56 may emit light while the door 68 is coupled to the vehicle 40 and in the closed position such that marker 56 provides an aesthetically pleasing ambient light to the interior 40A of the vehicle 40. In other words, the interior side marker 56 may be configured to reflect light off of the interior surface 68B of the door 68 to provide ambient lighting to the interior 40A of the vehicle 40.

The auxiliary side marker 140 is positioned on a door sill 148 of the vehicle 40. In the depicted example, the auxiliary side marker 140 is positioned along a bottom portion of the door sill 148, but it will be understood that the auxiliary side marker 140 may additionally or alternatively extend around a majority or an entirety of the door sill 148. In examples where only a portion of the door sill 148 is covered by the auxiliary side marker 140, the auxiliary side marker 140 may be positioned on the bottom, sides or top of the door sill 148 or any location therebetween. It will be understood that the auxiliary side marker 140 may be positioned on any door sill 148 defined by the vehicle 40. The auxiliary side marker 140 is depicted as a single, unitary, structure, but it will be understood that the marker 140 may be composed of a plurality of smaller markers, each of the same, or varying, size. Further, the vehicle 40 and/or door sill 148 may include a plurality of auxiliary side marker 140. According to at least one example, the auxiliary side marker 140 may be painted onto the door sill 148. According to yet other examples, the auxiliary side marker 140 may be part of a sticker which is adhered to the door sill 148.

According to various examples, the auxiliary side marker 140 may include the photoluminescent structure 10. As such, illumination of the auxiliary side marker 140 by the light assembly 52 may excite the marker 140 into emitting visible light. The illumination by the light assembly 52 may further function to charge (e.g., in persistent phosphor examples) the auxiliary side marker 140 such that the marker 140 emits light over a sustained period of time without constant and/or continual illumination by the light assembly 52. It will be understood that the auxiliary side marker 140 may further be charged, or caused to emit light, from ambient lighting (e.g., the sun, moon, street lamps, etc.) and/or illumination (e.g., head lights) from other vehicles. Further, the auxiliary side marker 140 may be charged while the door 68 is in the open position and when the door 68 is removed from the vehicle 40. The auxiliary side marker 140 may include one or a plurality of reflective elements which may reflect visible and/or nonvisible light which may increase visibility of the vehicle 40.

The auxiliary side marker 140 is configured to emit light outwardly and away from the vehicle 40. In examples where the auxiliary side marker 140 covers a majority and/or an entirety of the door sill 148, lighting from the auxiliary side marker 140 may outline the door sill 148. The light emitted from the auxiliary side marker 140 may be a variety of colors based on the charging or excitation light 24 received from the light assembly 52. For example, the auxiliary side marker 140 may be configured to glow, or emit, amber colored light while the vehicle 40 is in motion (e.g., driving). In another example, the auxiliary side marker 140 may be configured to emit white or colored light while the vehicle 40 is not in motion (e.g., parked). Further, the light emitted from the auxiliary side marker 140 may take a variety of other colors which may provide an aesthetically pleasing appearance to the vehicle 40 (e.g., based on predefined user preferences or color schemes of the vehicle 40).

Use of the auxiliary side marker 140 may be advantageous in increasing a visibility of the vehicle 40 while the vehicle 40 is in the door off configuration and/or while the door 68 is in the open position. For example, when the auxiliary side marker 140 is exposed (e.g., doors off or the door 68 is in the open position) the auxiliary side marker 140 is visible to other vehicles and designates a side of the vehicle 40. Illumination of the auxiliary side marker 140 may not only cause the marker 140 to immediately emit light, but may also charge the marker 140 to sustain a desired luminance for an extended period of time. Further, incorporation of one or more reflective elements into the auxiliary side marker 140 may provide a passive illumination which may increase the visibility of the vehicle 40.

An indicium 160 may be positioned on the seat assembly 60. In the depicted example, the indicium 160 is positioned in a center of the seatback 80, but it will be understood that the indicium 160 may be positioned anywhere on the seatback 80 and/or seat base 84. Further, the indicium 160 may include a plurality of indicia. The indicium 160 may be configured to convey information to on lookers of the vehicle 40 relating to the make, model, styling or trim package of the vehicle 40. Additionally or alternatively, the indicium 160 may simply be a decorative or aesthetic styling. According to at least one example, the indicium 160 may be painted onto the seat assembly 60. According to yet other examples, the indicium 160 may be part of a sticker which is adhered to the seat assembly 60.

According to various examples, the indicium 160 may include the photoluminescent structure 10. As such, illumination of the indicium 160 by the light assembly 52 may excite the indicium 160 into emitting visible light (e.g., colored or white). The illumination by the light assembly 52 may further function to charge (e.g., in persistent phosphor examples) the indicium 160 such that the indicium 160 emits light over a sustained period of time without constant and/or continual illumination by the light assembly 52. It will be understood that the indicium 160 may further be charged, or caused to emit light, from ambient lighting (e.g., the sun, moon, street lamps, etc.) and/or illumination (e.g., head lights) from other vehicles. Further, the indicium 160 may be charged regardless of door position of door configuration of the vehicle 40.

Figure 5:
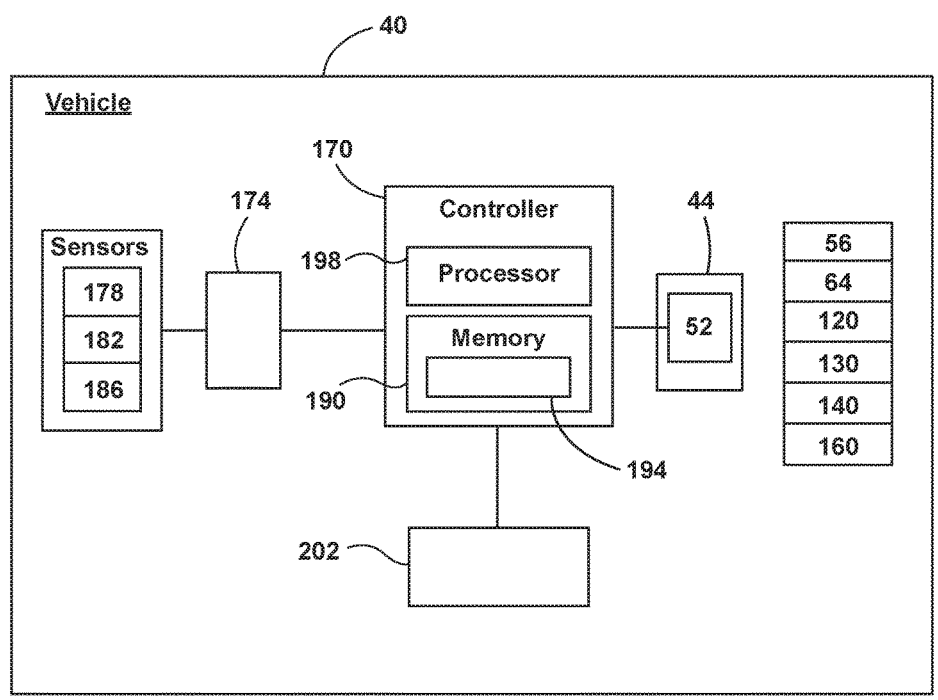
FIG. 5 is a block diagram of the vehicle, according to at least one example.

Referring now to FIG. 5, depicted is a block diagram of the vehicle 40 in which the light assembly 52 is implemented. The vehicle 40 includes a controller 170 in communication with one or more vehicle control modules 174. The vehicle control module 174 may be configured to relay information to the controller 170 from a variety of sensors. Exemplary sensors include a light sensor 178, an ambient light sensor 182 (e.g., a day/night sensor) and a hinge sensor 186. The light sensor 178 may be positioned within the A-pillar 48 (FIG. 4) and configured to detect light emitted from at least one of the interior side marker 56, exterior side marker 64, badge 120, door indicator 130, auxiliary side marker 140 and/or indicium 160. It will be understood that although described in connection with a single light sensor 178, the vehicle 40 may include a plurality of light sensors 178, each configured to detect a luminance value for a different region (e.g., side marker 56, 64, 140, badge 120, door indicator 130 and/or indicium 160) of the vehicle 40. The hinge sensor 186 may be configured to detect a hinge status (e.g., whether the door 68 is engaged or not engaged and/or in the open or closed position) of the vehicle 40 (e.g., indicating the doors on or doors off status of the vehicle 40). Additionally or alternatively to the hinge sensor 186, the presence or position of the door 68 may be determined based on a "roll call" to linear interconnect network modules in the door 68 (e.g., window switches and/or door lock switches).

The controller 170 may include a memory 190 having a light control routine 194 contained therein that is executed by a processor 198 of the controller 170. The controller 170 may provide electrical power to the light assembly 52 via a power source 202 located onboard the vehicle 40. In addition, the controller 170 may be configured to control the light emitted from the light assembly 52 based on feedback received from the vehicle control module 174. The light control routine 194 may include a variety of routines configured to cause the controller 170 to vary the intensity, on/off status and/or color of the light emitted from the light assembly 52.

In a first example, the light control routine 194 of the controller 170 may be configured to utilize input data from the ambient light sensor 182 to provide the puddle lamp 100 and/or the map lamp 104. It will be understood that additionally or alternatively, the puddle lamp 100 and/or the map lamp 104 may be activated based on user preference (e.g., a switch) and/or other inputs. As explained above, positioning of the side mirror 44 on the A-pillar 48 allows the light assembly 52 to provide the puddle lamp 100 and/or the map lamp 104 regardless of the position of the door 68 and/or door configuration of the vehicle 40. The puddle lamp 100 may be activated when the vehicle 40 detects (e.g., ultrasonic, Bluetooth, etc.) the approach of a user of the vehicle 40 and/or when the controller 170 anticipates (e.g., via hinge status) that an occupant of the vehicle 40 is about to exit the vehicle 40. In other words, the puddle lamp 100 and/or the map lamp 104 may be activated in conjunction with a "welcome" or "farewell" light routine of the vehicle 40.

In a second example, the light control routine 194 may control the light assembly 52 to illuminate the exterior side marker 64 when the controller 170 detects that the vehicle 40 is in the doors on configuration (e.g., through the hinge sensor 186). It will be understood that the activation of the light assembly 52 to illuminate the exterior side marker 64 may additionally be based on input from the ambient light sensor 182 (i.e., indicating night time and that the exterior side markers 64 should be illuminated for greater visibility). The color of light emitted from the exterior side marker 64 may be controlled based on the driving status (e.g., driving, parked, etc.) of the vehicle 40.

In a third example, the light control routine 194 may control the light assembly 52 to illuminate the interior side marker 56 and/or auxiliary side marker 140 when the controller 170 detects that the vehicle 40 is in the doors off configuration (e.g., through the hinge sensor 186). It will be understood that the activation of the light assembly 52 to illuminate the interior side marker 56 and/or auxiliary side marker 140 may additionally be based on input from the ambient light sensor 182 (i.e., indicating night time and that the interior side markers 56 should be illuminated for greater visibility).

In a fourth example, the light control routine 194 may control the light assembly 52 to illuminate the door indicator 130 when the controller 170 detects that the door 68 is in the open position. Illumination of the door indicator 130, while the door 68 is in the open position, may be advantageous in alerting other vehicles to the open position of the door 68 which may increase safety of the vehicle 40. It will be understood that the interior side marker 56 and/or the auxiliary side marker 140 may be illuminated while the door indicator 130 is illuminated to increase visibility of the vehicle 40.

In a fifth example, the light sensor 178 may detect a luminance from any of the side markers 56, 64, 140, badge 120, door indicator 130 and/or indicium 160 and determine if the luminance value falls below a predefined threshold. In such an example, the light control routine 194 may be configured to pulse or flash the light assembly 52 to charge any of the side markers 56, 64, 140, badge 120, door indicator 130 and/or indicium 160 such that the luminance measured by the light sensor 178 meets or exceeds the predefined value.

In a sixth example, the light control routine 194 may be configured to flash or otherwise indicate to an occupant of the vehicle 40 that the door 68 has been removed and/or is not correctly attached.

It will be understood that the light control routine 194 may perform any or all of the above noted examples, simultaneously or in sequence, without departing from the teachings provided herein.

Use of the present disclosure may offer a variety of advantages. First, as the side mirror 44 is coupled to the A-pillar 48, the mirror 44 and the light assembly 52 may remain in substantially the same position regardless of door position or door configuration of the vehicle 40. As the side mirror 44 and the light assembly 52 remain attached to the vehicle 40, the light assembly 52 may illuminate a plurality of locations regardless of the doors on and doors off configurations. Second, the side mirror 44 may provide the puddle lamp 100 regardless of door position and door configuration of the vehicle 40. Third, photoluminescent structure 10 examples of the side markers 56, 64, 140, badge 120, door indicator 130 and/or indicium 160 may allow the light assembly 52 to run for only a short period of time to illuminate (e.g., charge) the structures 10 thereby decreasing energy usage of the vehicle 40. Further, by using photoluminescent structures 10 in the side markers 56, 64, 140, badge 120, door indicator 130 and/or indicium 160, passive charging (e.g., which may reduce power consumption) from ambient light sources may be achieved. Fourth, use of the auxiliary side marker 140 may further allow a user of the vehicle 40 to enter and exit the vehicle 40 in a safe manner in low lighting conditions because the marker 140 illuminates at least a portion of the door sill 148. Fifth, the map lamp 104 provided by the light assembly 52 may be utilized regardless of door position or door configuration of the vehicle 40. Further, as the map lamp 104 is provided on the seat base 84 (e.g., proximate or below a belt level of an occupant of the seat assembly 60), the map lamp 104 may cause less driver distraction and provide a more aesthetically pleasing illumination. Sixth, use of the door indicator 130 may replace the use of traditional red passive reflectors attached to door 68. The light emitted from the door indicator 130 may provide enhanced visibility, and therefore safety, while the door 68 is in the open position. Seventh, the indicium 160 may provide an aesthetically pleasing design which may be readily viewed by occupants of the vehicle 40 as well as people exterior to the vehicle 40 (e.g., in either the door on or doors off configuration).

According to various examples, a vehicle is provided herein including a side mirror positioned on an A-pillar. A light assembly is coupled with a bottom surface of the side mirror. The light assembly is configured to illuminate a plurality of photoluminescent structures located within an interior and on an exterior of the vehicle when the vehicle is in a doors off configuration. Examples of the vehicle can include any one or a combination of the following features:
- at least one of the photoluminescent structures comprises an interior side marker positioned on a seat assembly;
- the interior side marker is positioned on a seat base of the seat assembly;
- the interior side marker is positioned on an outboard surface of the seat base;
- at least one of the photoluminescent structures comprises a badge positioned on an exterior of the vehicle;
- at least one of the photoluminescent structures comprises an auxiliary side marker positioned on a door sill;
- at least one of the photoluminescent structures comprises a phosphorescent material.
- the light assembly is further configured to emit a puddle lamp on a ground beneath the vehicle;
- the light assembly is further configured to illuminate an open door indicator positioned on an interior surface of a door; and/or
- the photoluminescent structures are configure to emit light toward an exterior of the vehicle.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents. Example embodiments include the following.

What is claimed is:
1. A vehicle, comprising:
a plurality of photoluminescent structures located within an interior and on an exterior of the vehicle;
a side mirror positioned on the exterior of the vehicle on an A-pillar; and
a light assembly coupled with a bottom surface of the side mirror, wherein the light assembly is configured to illuminate the plurality of photoluminescent structures when the vehicle is in a doors off configuration.
2. The vehicle of claim 1, wherein at least one of the photoluminescent structures comprises an interior side marker positioned on a seat assembly.

3. The vehicle of claim 2, wherein the interior side marker is positioned on a seat base of the seat assembly.

4. The vehicle of claim 3, wherein the interior side marker is positioned on an outboard surface of the seat base.

5. The vehicle of claim 1, wherein at least one of the photoluminescent structures comprises a badge positioned on an exterior of the vehicle.

6. The vehicle of claim 1, wherein at least one of the photoluminescent structures comprises an auxiliary side marker positioned on a door sill.

7. The vehicle of claim 1, wherein at least one of the photoluminescent structures comprises a phosphorescent material.

8. The vehicle of claim 1, wherein the light assembly is further configured to emit a puddle lamp on a ground beneath the vehicle.

9. The vehicle of claim 1, wherein the light assembly is further configured to illuminate an open door indicator positioned on an interior surface of a door.

10. A vehicle, comprising:
an exterior side mirror positioned on an A-pillar;
a light assembly coupled to the exterior side mirror;
an interior side marker positioned on a seat assembly; and
an exterior side marker positioned on an external surface of a door, wherein the light assembly is configured to illuminate the interior and exterior side markers.

11. The vehicle of claim 10, wherein the interior side marker is positioned on an outboard surface of the seat assembly.

12. The vehicle of claim 11, wherein the interior side marker is positioned on the outboard surface of a seat base of the seat assembly.

13. The vehicle of claim 10, wherein at least one of the interior and exterior side markers comprises a photoluminescent structure.

14. The vehicle of claim 10, further comprising:
an auxiliary side marker positioned on a door sill.

15. A vehicle, comprising:
an exterior side mirror positioned on an A-pillar;
a light assembly coupled to the exterior side mirror; and
a door positioned proximate the exterior side mirror operable between closed and open positions, wherein the light assembly is configured to illuminate photoluminescent structures positioned on a seat assembly and an inner surface of the door.

16. The vehicle of claim 15, wherein the light assembly is further configured to illuminate a badge located on an exterior of the vehicle while the door is in the open position.

17. The vehicle of claim 16, wherein the light assembly is further configured to emit a puddle lamp on a ground beneath the vehicle while the door is in the open position.

18. The vehicle of claim 17, further comprising:
an auxiliary side marker positioned on a door sill.

19. The vehicle of claim 18, wherein the auxiliary side marker comprises a photoluminescent structure.

20. The vehicle of claim 19, wherein the photoluminescent structures are configured to emit light toward an exterior of the vehicle.

* * * * *